United States Patent
Gangadharan et al.

(10) Patent No.: US 7,493,392 B1
(45) Date of Patent: Feb. 17, 2009

(54) METHOD AND APPARATUS FOR ASSEMBLY OF VIRTUALLY CONCATENATED DATA

(75) Inventors: Hariprasad Gangadharan, Bangalore (IN); Madugiri Siddaraju Anitha, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 848 days.

(21) Appl. No.: 10/327,232

(22) Filed: Dec. 20, 2002

(51) Int. Cl.
G06F 15/173 (2006.01)

(52) U.S. Cl. .................. 709/225; 709/236; 707/100; 707/101; 711/171

(58) Field of Classification Search ........... 709/200, 709/225, 236; 707/101, 100; 711/171
See application file for complete search history.

(56) References Cited

U.S. PATENT DOCUMENTS

| | | |
|---|---|---|
| 4,433,378 A | 2/1984 | Leger |
| 4,841,526 A | 6/1989 | Wilson et al. |
| 4,920,483 A | 4/1990 | Pogue et al. |
| 4,965,794 A | 10/1990 | Smith |
| 5,079,693 A | 1/1992 | Miller |
| 5,182,651 A | 1/1993 | Kishi |
| 5,291,586 A | 3/1994 | Jen et al. |
| 5,319,648 A | 6/1994 | Bux et al. |
| 5,386,412 A | 1/1995 | Park et al. |
| 5,471,628 A | 11/1995 | Phillips et al. |
| 5,825,770 A | 10/1998 | Coady et al. |
| 5,844,923 A | 12/1998 | Condon |
| 5,920,572 A | 7/1999 | Washington et al. |
| 5,930,830 A * | 7/1999 | Mendelson et al. ......... 711/171 |
| 5,964,835 A | 10/1999 | Fowler et al. |
| 6,144,574 A | 11/2000 | Kobayashi et al. |
| 6,347,097 B1 | 2/2002 | Deng |
| 6,359,911 B1 | 3/2002 | Movshovich et al. |
| 6,442,669 B2 | 8/2002 | Wright et al. |
| 6,584,584 B1 | 6/2003 | Smith |
| 6,640,297 B1 | 10/2003 | Banning et al. |

(Continued)

OTHER PUBLICATIONS

Nilam Ruparelia, *Delivering Ethernet Over Sonet Using Virtual Concatenation*, CommsDesign, Feb. 25, 2002, 8 pages, www.commsdesign.com/story/OEG20020225S0078.

(Continued)

*Primary Examiner*—Tonia L Dollinger
*Assistant Examiner*—Kyung H Shin
(74) *Attorney, Agent, or Firm*—Blakely, Sokoloff, Taylor & Zafman LLP

(57) ABSTRACT

In one embodiment, the invention is an apparatus for assembling data for virtual concatenation. The apparatus includes an auxiliary memory having a set of storage locations for data. The apparatus also includes an external memory having a set of storage locations for data. The apparatus further includes a data assembler coupled to the auxiliary memory and the external memory. The data assembler is to read data of a virtual container from the external memory. The data assembler is also to store data of the virtual container in the auxiliary memory. The data assembler is further to determine if all data of the virtual container is present in the auxiliary memory. The data assembler is also to generate a set of addresses of the data of the virtual container in the auxiliary memory. The data assembler is further to read the data of the virtual container from the auxiliary memory. The data assembler is also to interleave the data of the virtual container.

19 Claims, 7 Drawing Sheets

U.S. PATENT DOCUMENTS

| | | | |
|---|---|---|---|
| 6,654,383 B2 | 11/2003 | Haymes et al. | |
| 6,714,543 B1 * | 3/2004 | Brueckheimer et al. | 370/395.1 |
| 6,741,594 B1 | 5/2004 | Tzeng et al. | |
| 6,763,390 B1 | 7/2004 | Kovacevic et al. | |
| 6,957,309 B1 | 10/2005 | Gupta et al. | |
| 6,961,348 B2 | 11/2005 | Yu | |
| 7,035,335 B1 | 4/2006 | Iacobelli et al. | |
| 7,061,930 B2 | 6/2006 | Mizobata | |
| 7,069,407 B1 | 6/2006 | Vasudevan et al. | |
| 7,073,019 B2 | 7/2006 | Banerjee et al. | |
| 7,088,732 B2 | 8/2006 | Min | |
| 7,324,562 B1 | 1/2008 | Shankar et al. | |
| 7,400,620 B1 | 7/2008 | Verma | |
| 7,420,975 B1 | 9/2008 | Vasudevan | |
| 2001/0008564 A1 | 7/2001 | Hirao et al. | |
| 2001/0049726 A1 | 12/2001 | Comeau et al. | |
| 2002/0009100 A1 | 1/2002 | Raghavan et al. | |
| 2003/0120664 A1 * | 6/2003 | Davidson et al. | 707/100 |
| 2003/0169735 A1 | 9/2003 | Johnson et al. | |
| 2004/0064589 A1 | 4/2004 | Boucher et al. | |
| 2004/0117584 A1 | 6/2004 | Banerjee et al. | |
| 2004/0196847 A1 | 10/2004 | Kuwabara | |

OTHER PUBLICATIONS

Louis E. Frenzel, *Programmable Framer Chip Improves OC-48 Efficiency*, Electronic Design, Apr. 16, 2001, 4 pages.

Michael Timothy Moore, *Filling the WAN-Communications-Line Card*, designfeature, Apr. 18, 2002, 5 pages, www.ednmag.com.

Eddie Kohler, Robert Morris, Benjie Chen, "Programming Language Optimizatins For Modular Router Configurations" ACM SIGOPS Operating Systems Review, vol. 36, 30, 37, Issue, 5, 5, 10, Oct. 2002.

Imrich Chlamtac et al, "Scalable WDM Access Network Architecture Based on Photonic Slot Routing" IEEE/ACM Transactions on networking (TON), vol. 7, Issue 1, pp. 1-9, Feb. 1999.

Finney et al. "Using a Common Barrel Shifter for operand normalizatio, operand alignment and operand unpack & pack in floating point", IBM TDB vol. 29 No. 2 Jul. 1986.

U.S. Appl. No. 10/325,555, Final Office Action mailed Jul. 11, 2008, 14 pages.

U.S. Appl. No. 10/324,308, Notice of Allowance mailed May 6, 2005, 6 pages.

U.S. Appl. No. 10/317,874, Notice of Allowance mailed Feb. 14, 2006, 5 pages.

U.S. Appl. No. 10/327,456, Notice of Allowance mailed Feb. 23, 2006, 9 pages.

U.S. Appl. No. 10/327,250, Notice of Allowance mailed Sep. 11, 2007, 9 pages.

U.S. Appl. No. 10/327,524, Notice of Allowance mailed May 2, 2008, 12 pages.

U.S. Appl. No. 10/325,415, Notice of Allowance mailed Feb. 6, 2008, 7 pages.

* cited by examiner

METHOD AND APPARATUS FOR ASSEMBLY OF VIRTUALLY CONCATENATED DATA

FIELD

The invention relates generally to circuits and methods for manipulation of stored data, and more specifically to circuitry and corresponding methods for data assembly in a virtual concatenation process.

BACKGROUND

In general, networks and computers operate in different manners. Networks operate by transferring data in streams and/or packets. Streams may be bit-sized, byte-sized, or otherwise broken down. Packets may be of relatively large size, such as 64, 512, or more bytes each. Computers operate by processing data, typically in well-defined small sizes, such as bytes (8 bits), words (16 bits), double words (32 bits) and so on. At the interface between a computer and a network, a translation or reorganization of data may be necessary. This may include reorganizing data from a series of packets into a format useful to a processor.

Reorganization of data may be performed at a memory storage location level. In particular, bytes or words may arrive in parts due to compression and packetization of data and also due to the different paths taken by the data for transport over a network. The data as provided may be in an order which was useful for transmission purposes, but is not particularly useful for processing within a system, or for transmission over a different type of network. For example, the data may arrive as bytes which may be stored in memory, but the data may effectively arrive out of order relative to what a processor would expect in a system. In such an example, it may be necessary to re-align and reassemble the data in a form in which it existed prior to transmission.

Moreover, providing data to a processor of a host system in an easy to use manner may be desirable. Processors in host systems are typically used to perform most of the operations of the host system. To the extent that the processor needs to reorganize data for its use, this taxes limited processor resources, and potentially taxes other resources such as datapath-related or bandwidth-related resources in the system.

SUMMARY

In one embodiment, the invention is an apparatus for assembling data for virtual concatenation. The apparatus includes an auxiliary memory having a set of storage locations for data. The apparatus also includes an external memory having a set of storage locations for data. The apparatus further includes a data assembler coupled to the auxiliary memory and the external memory. The data assembler is to read data of a virtual container from the external memory. The data assembler is also to store data of the virtual container in the auxiliary memory. The data assembler is further to determine if all data of the virtual container is present in the auxiliary memory. The data assembler is also to generate a set of addresses of the data of the virtual container in the auxiliary memory. The data assembler is further to read the data of the virtual container from the auxiliary memory. The data assembler is also to interleave the data of the virtual container.

In an alternate embodiment, the invention is a method of assembling data for virtual concatenation. The method includes generating addresses for an auxiliary memory corresponding to a set of unassembled data from a virtual container. The method also includes reading unassembled data of the auxiliary memory at the addresses generated. The method further includes interleaving unassembled data to form properly ordered data.

In another alternate embodiment, the invention is also an apparatus for assembling data for virtual concatenation. The apparatus includes a means for generating addresses for an auxiliary memory corresponding to a set of unassembled data from a virtual container. The apparatus also includes means for reading unassembled data of the auxiliary memory at the addresses generated. The apparatus further includes means for interleaving unassembled data to form properly ordered data.

BRIEF DESCRIPTION OF THE DRAWINGS

The present invention is illustrated by way of example and not limitation in the accompanying figures.

DETAILED DESCRIPTION

Figure 1:
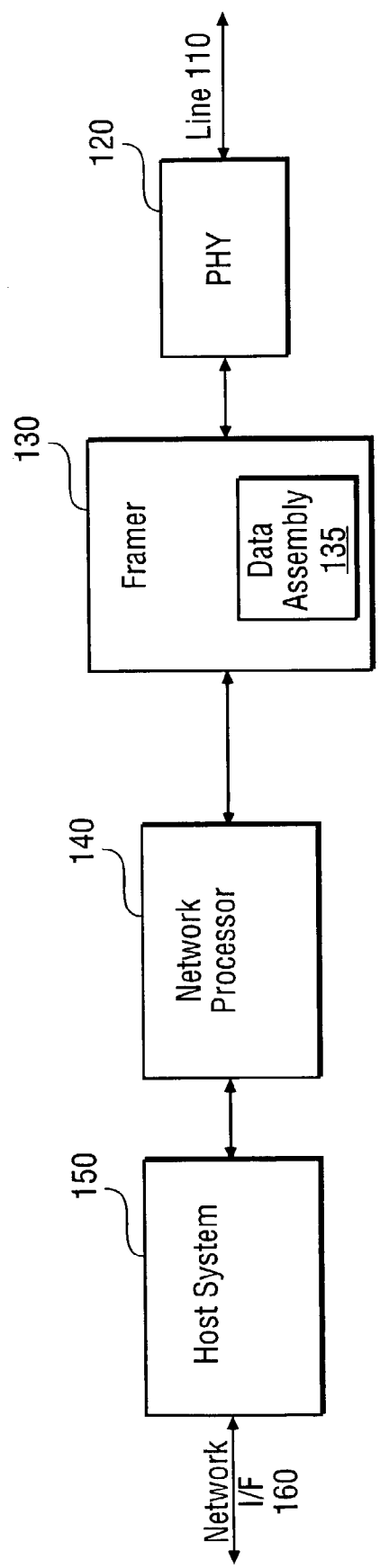
FIG. 1 illustrates a system which may contain an embodiment, such as embodiments illustrated in the following figures.

A method and apparatus for assembly of virtually concatenated data is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Various descriptions of this document relate to devices or components being coupled together. Coupling typically denotes a relationship allowing for communication or connection between a first and second object. The first object may be directly connected to the second object. Alternatively, the first object may be directly connected to a third object which may also be directly connected to the second object, thereby achieving a coupling between the first object and the second object. As will be appreciated, the number of intermediate objects between two objects which are coupled together does not determine whether the objects are coupled, the presence of a link between the two objects indicates that the two objects are coupled together.

In general, the apparatus, method, or system of the invention may be expected to receive data in a first form, read, sort and reorganize that data into a second form, and provide that data in the second form for reading in a first-in-first-out manner based on the second form. Essentially, the data will appear to a subsystem requesting the data from the data assembler as though it arrived in the desired second form, rather than the undesired first form. The data in the first form typically includes information relating to ordering of that data, although that information may be available separately, rather than with the data.

In one embodiment, the invention is an apparatus for assembling data for virtual concatenation. The apparatus includes an auxiliary memory having a set of storage locations for data. The apparatus also includes an external memory having a set of storage locations for data. The apparatus further includes a data assembler coupled to the auxiliary memory and the external memory. The data assembler is to read data of a virtual container from the external memory. The data assembler is also to store data of the virtual container in the auxiliary memory. The data assembler is further to determine if all data of the virtual container is present in the auxiliary memory. The data assembler is also to generate a set of addresses of the data of the virtual container in the auxiliary memory. The data assembler is further to read the data of the virtual container from the auxiliary memory. The data assembler is also to interleave the data of the virtual container.

In an alternate embodiment, the invention is a method of assembling data for virtual concatenation. The method includes generating addresses for an auxiliary memory corresponding to a set of unassembled data from a virtual container. The method also includes reading unassembled data of the auxiliary memory at the addresses generated. The method further includes interleaving unassembled data to form properly ordered data.

In another alternate embodiment, the invention is also an apparatus for assembling data for virtual concatenation. The apparatus includes a means for generating addresses for an auxiliary memory corresponding to a set of unassembled data from a virtual container. The apparatus also includes means for reading unassembled data of the auxiliary memory at the addresses generated. The apparatus further includes means for interleaving unassembled data to form properly ordered data.

FIG. 1 illustrates a system which may contain an embodiment, such as embodiments illustrated in the following figures. Data is received and sent on line 110, which may be a fiber optic cable for example. Coupled to line 110 is physical layer 120, which translates signals from line 110 into a form suitable for use by circuitry, such as through optoelectronic transformation. Coupled to physical layer 120 is framer 130, which operates to frame or deframe data for transmission or reception, and includes data assembly subsystem 135. Data assembly subsystem 135 may be implemented using the embodiments described with respect to FIGS. 2 and 4 for example. Coupled to framer 130 is network processor 140, which may be used to process data for transmission or reception. Coupled to network processor 140 is host system 150, which may transfer data between network processor 140 and a network interface 160, which couples to an internal network.

Figure 2:
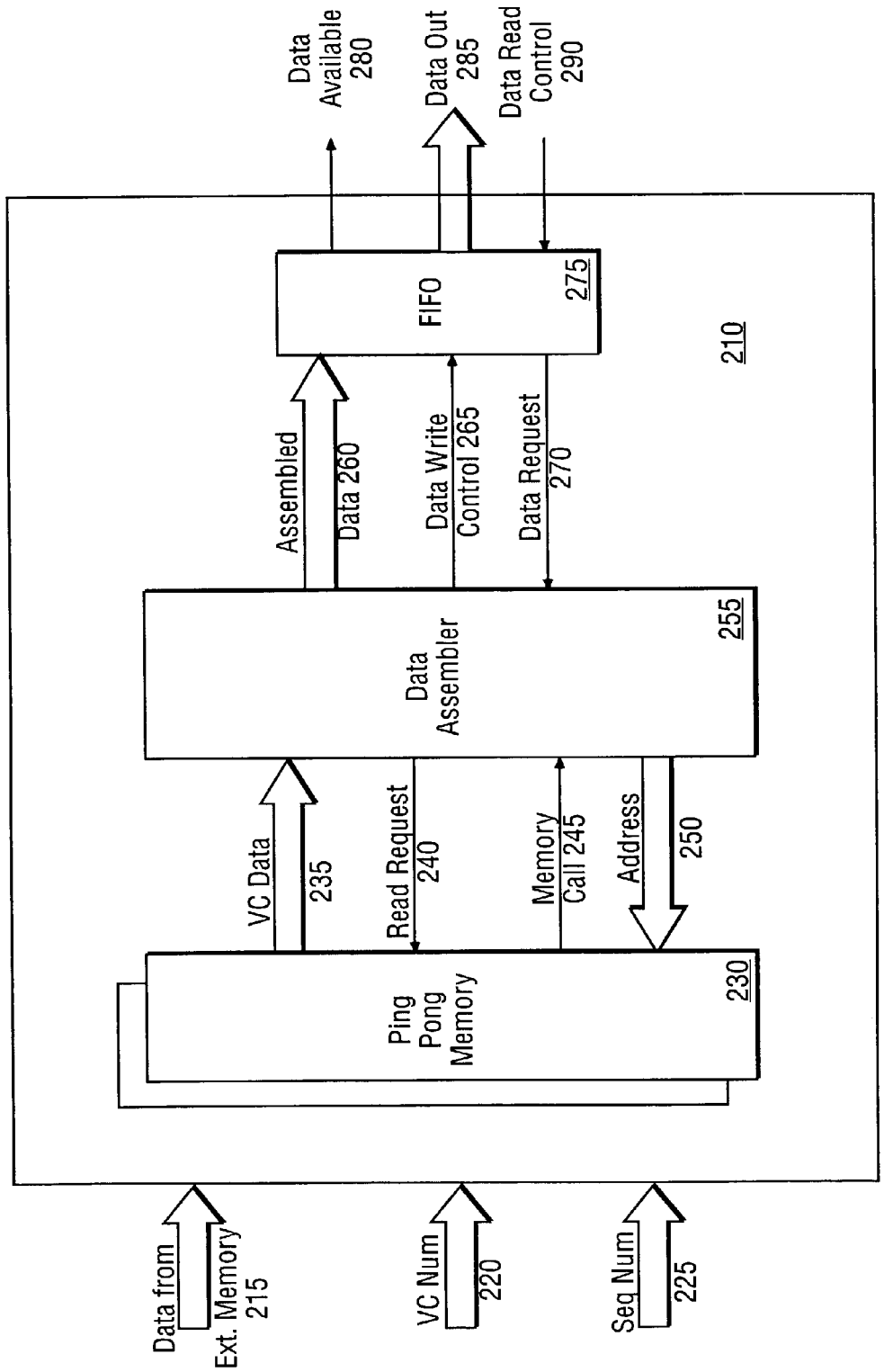
FIG. 2 illustrates an embodiment of a data assembler in block diagram form.

FIG. 2 illustrates an embodiment of a data assembler in block diagram form, such as may be used in the system of FIG. 1 for example. The data assembler is part of a data assembly subsystem 210, which includes data assembler 255, ping pong memory 230, and FIFO 275, and may be expected to interface with an external memory to receive data (not shown), and another external subsystem (also not shown) which receives data from the data assembly subsystem 210. Working in concert, the data assembler 255 and ping pong memory 230 receive data in an unassembled format, read and sort the data into an expected format and store the sorted data into the FIFO 275 to provide the data in an expected format for reading in a first-in-first-out manner.

Data assembly subsystem 210 receives data 215 from an external memory source, along with an associated virtual container number 220 and a sequence number 225. In one embodiment, each of data 215 is stored in a first memory bank of ping pong memory 230 in the location specified by the virtual container number. In one embodiment, this is repeated until the memory bank of the ping pong memory 230 is full, and then the data 215 is stored in a second memory bank of the ping pong memory corresponding to the received virtual container number 220

The ping pong memory (such as ping pong memory 230) is formed of two banks of memory. Both memory banks are essentially identical. Each bank of memory has sub banks and each of the virtual containers is allocated one sub bank in both banks of the ping pong memory.

When the first memory bank (or potentially any memory bank) of ping pong memory 230 is full, a memory full signal 245 is provided to data assembler 255. Data assembler 255 may then be expected to operate on the first memory bank of ping pong memory 230. Data assembler 255 may be expected to calculate or otherwise generate addresses to be used in reading data from ping pong memory 230. The address generation portion of data assembler 255 takes care of reading the data from the ping pong memory 230 such that the ping pong memory 230 outputs sorted data. Data assembler 255 thus may be expected to use these addresses, provided singly as address 250, along with a read request signal 240, to read VC (virtual-container) data 235 from ping pong memory 230. This may be repeated as necessary to read the contents from the first memory bank of ping pong memory 230 until it is empty. The data 235 is then read from the second memory bank in the same way as in the case of the first memory bank. The read from the ping pong memory 230 is alternated between the first memory bank and the second memory bank. The switch from the first memory bank to the second memory bank takes place when the first memory bank is empty and vice versa. The contents of the memory banks of ping pong memory 230 may be expected to include the data received from the external memory 215.

The data from ping pong memory 230 may then be interleaved into a proper byte order. Other methods of associating data with virtual-containers and sequence numbers may also be utilized.

With the data assembled, it may then be transferred to FIFO 275, such that an associated subsystem may read the data from FIFO 275. In one embodiment, when the data is assembled, a data write control signal 265 is sent to FIFO 275, to cause FIFO 275 to prepare to accept the data. The FIFO 275 then sends back data request signal 270 to data assembler 255, which responds by sending out some portion (or all) of the assembled data to the FIFO 275 as data 260. When the FIFO 275 has a predetermined amount of data available, it sends out data available signal 280 to an external subsystem, which controls reading through data read control signal 290 and receives the data from the FIFO 275 as data out 285.

In one embodiment, write operations from an external memory to a ping pong memory are implemented as described here. The external memory is used to re-align data that gets skewed due to the propagation delay through the network. After differential delay correction, data is read out of the external memory for each of the virtual containers. All virtual containers are identified by their respective VC numbers. The data read out of the external memory is stored in one of the banks of the ping pong memory (depending on which bank is empty). For example, while external memory output is being written into the first bank of the ping pong memory the data assembler will be processing data that is present in the second bank of the ping pong memory and vice versa.

Similarly, in one embodiment, read operations from the ping pong memory to the FIFO are implemented as described herein. A sequence look up table within the data assembler block stores the virtual container numbers in the sorted order. The data assembler reads data from the ping pong memory. The selection of the banks in the ping-pong memory is alternated. The data assembler reads from the first bank until it becomes empty and then switches to the second bank and vice versa. The address generation block generates the address of the data to be read from the ping pong memory. This address is the sorted address stored in the sequence map and hence ping pong memory data output is sorted data. The data assembler assembles the data received for each of the virtual containers from the ping pong memory in a byte-interleaved manner in to a contiguous channel. Data words as thus obtained after assembling are written into a FIFO. The data in the FIFO is then output to the outside world when requested.

Figure 3:
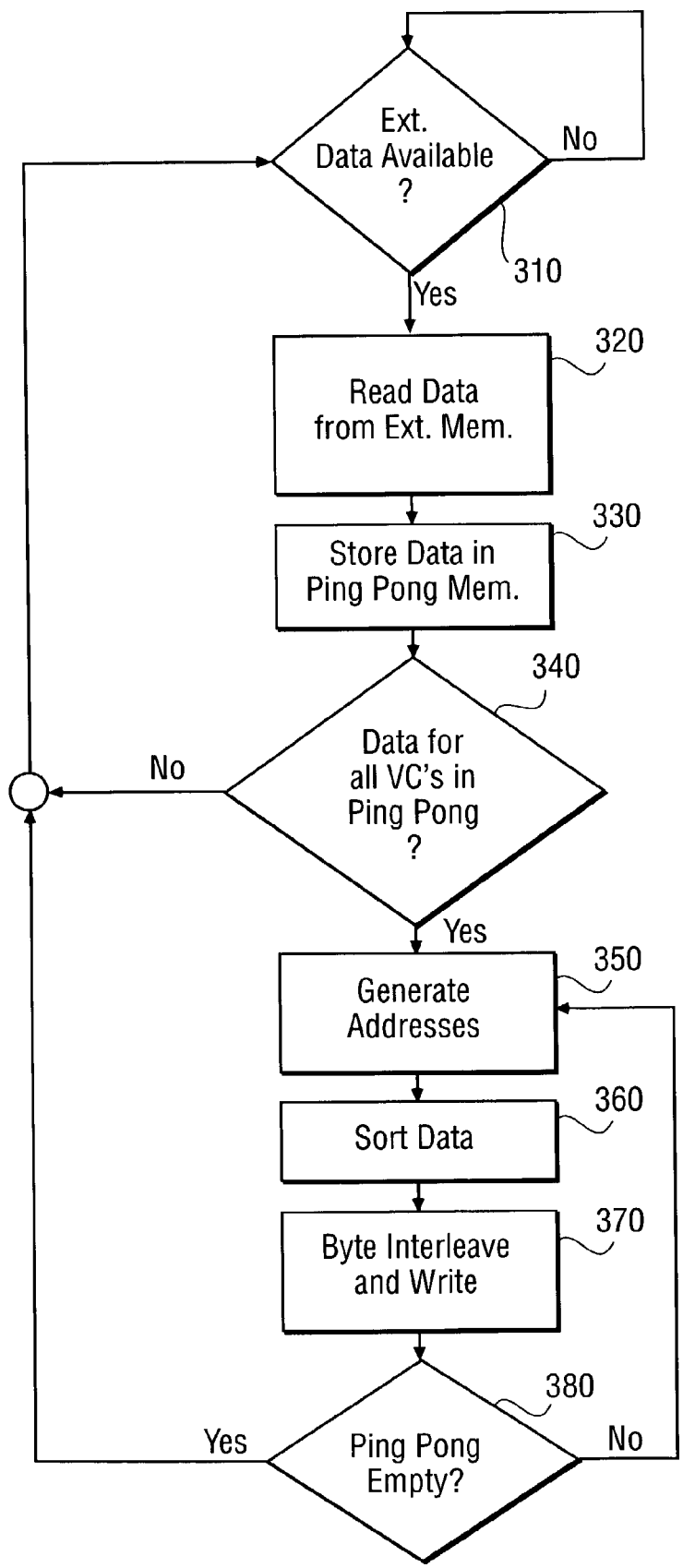
FIG. 3 illustrates an embodiment of data assembly in flow diagram form.

FIG. 3 illustrates an embodiment of data assembly in flow diagram form, such as may be practiced by the embodiment of FIG. 2, for example. In general, the process may be viewed as waiting for external data, retrieving the external data, waiting until enough external data has been retrieved, processing that data into a form useful internally by reading the data, sorting it, and interleaving it, and then making the data available in the new form.

At block 310, a determination is made as to whether external data is available. If not, the process continues until it is determined external data is available. At block 320, the external data is read from external memory, or otherwise received. At block 330, the external data is stored in the selected bank of the ping pong memory. At block 340, a determination is made as to whether data for all virtual containers is available in the ping-pong memory. If not, the process continues to wait for more external data at block 310.

If data for all virtual-containers is available, the process proceeds to block 350, and addresses for the data of the selected bank of the ping pong memory are generated. At block 360, the data of the ping pong memory is read and sorted, based on control information associated with the sequence map. At block 370, the sorted data received from the ping pong memory is then interleaved, and the data is then written to a FIFO or other memory for access by another subsystem or component. At block 380, a determination is made as to whether the first and the second memory bank of the ping pong memory is empty. If not, the process returns to block 350. If both the memory banks of the ping pong memory is empty, the process returns to block 310, and awaits data from the external source.

Figure 4:
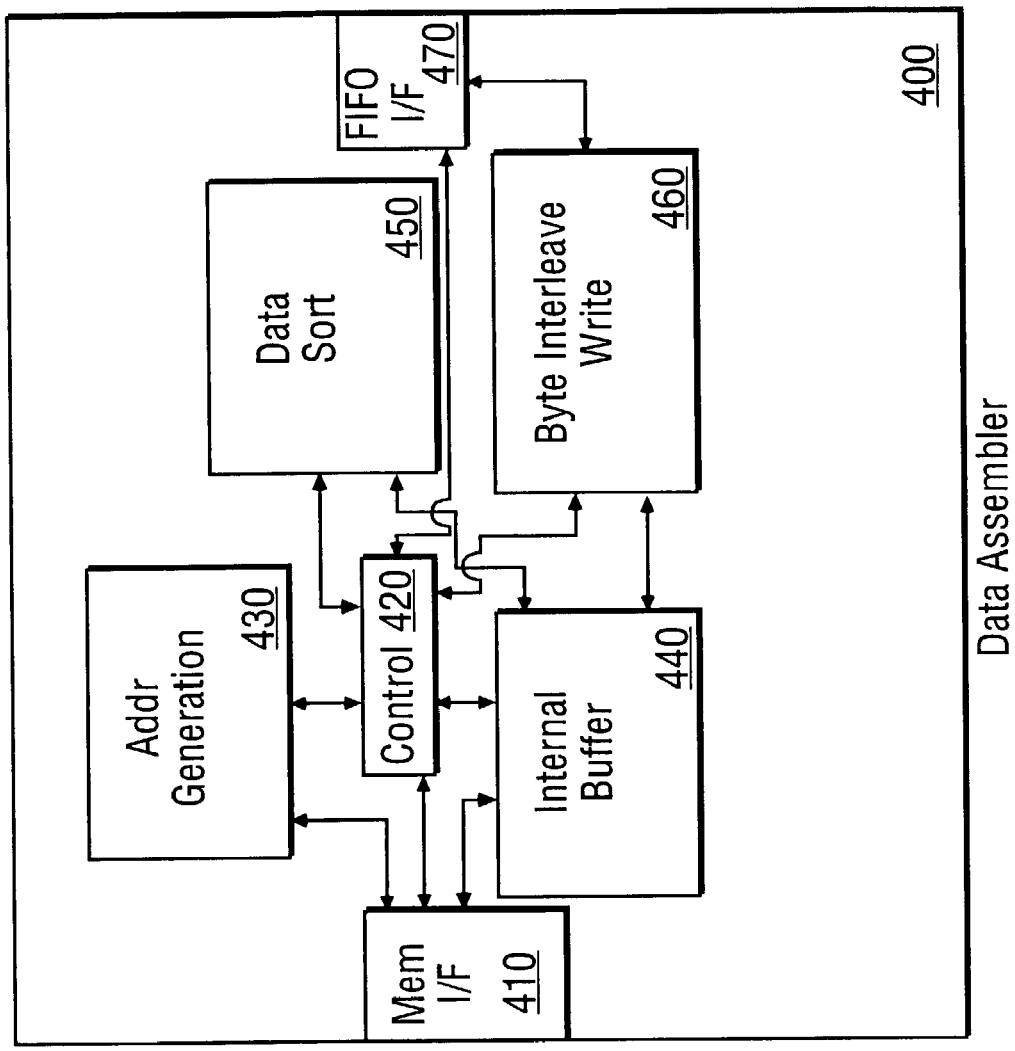
FIG. 4 illustrates an alternate embodiment of a data assembler in block diagram form.

FIG. 4 illustrates an alternate embodiment of a data assembler in block diagram form, such as may be included in the system of FIG. 1, for example. Control block 420 controls operation of the various portions of the data assembler 400. Coupled to control block 420 is memory interface 410, which allows communication with an external memory, such as a ping pong memory. Coupled to control block 420 and memory interface 410 is address generation block 430, which may be used to generate addresses for use in reading data from the external memory. Also coupled to control block 420 and memory interface 410 is internal buffer 440, into which data may be stored from memory interface 410 for use within data assembler 400.

Coupled to control block 420 and internal buffer 440 is data sorter 450, which may be used to sort virtual container numbers within the internal buffer 440 based on a sequence number related to the virtual container. Also coupled to control block 420 and internal buffer 440 is address generator block 430. The address generation block reads from the internal buffer 440 to get the virtual container numbers in the sorted order and generates addresses to read from the ping pong memory. Byte interleave module 460 interleaves bytes output from the ping pong memory, and then writes the data out through FIFO interface 470. FIFO interface 470 is coupled to both control block 420 and byte interleave module 460, and is suitable for connection or coupling to an external FIFO memory, for the purpose of providing data to the external FIFO memory.

Figure 5:
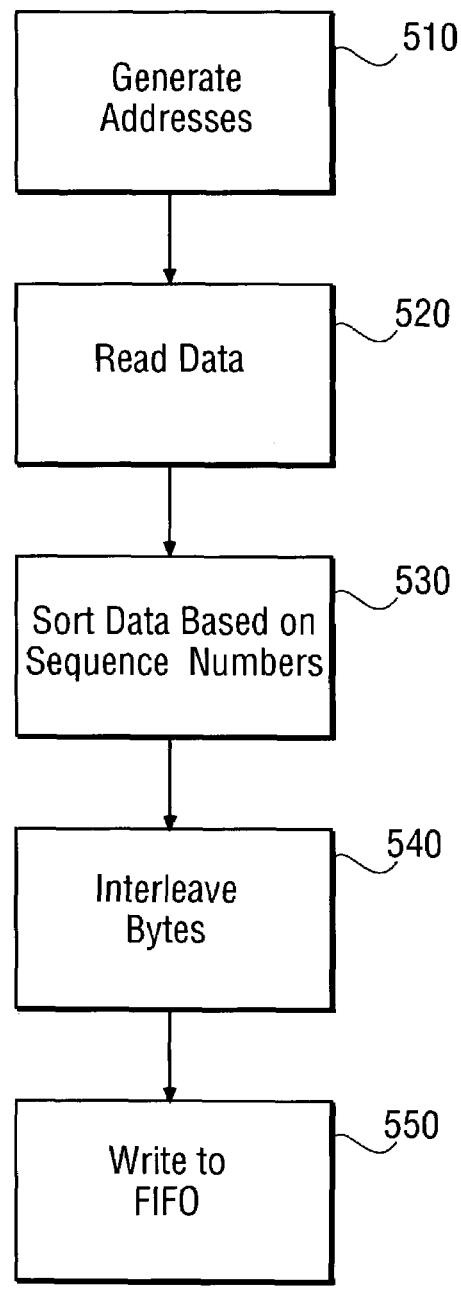
FIG. 5 illustrates an embodiment of a process of assembling data in flow diagram form.

FIG. 5 illustrates an embodiment of a process of assembling data in flow diagram form, such as may be practiced by a data assembly apparatus. At block 510, addresses for the data in a memory such as a ping pong memory are generated. At block 520, the data from the memory is read, using the addresses from block 510. At block 530, the data is sorted based on sequence numbers associated with the data. At block 540, the data as sorted is interleaved based on virtual-container information associated with the data, such that the data for each virtual-container is now available in its proper order. At block 550, the data is then written to a FIFO or other external memory, for use by another subsystem. Note that the actual usage of the sequence number and virtual container number may vary, and may be used as described previously for example.

Figure 6:
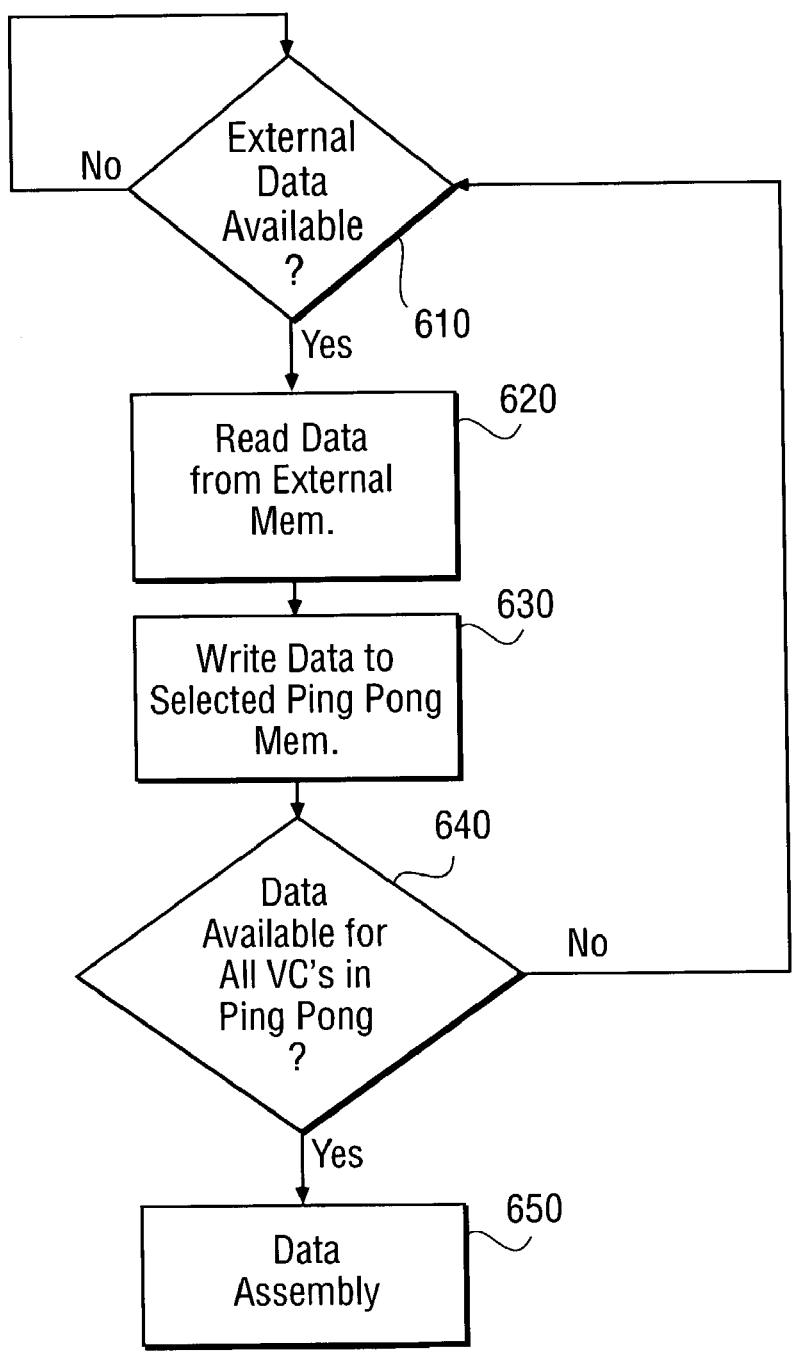
FIG. 6 illustrates an embodiment of a process of acquiring data in flow diagram form.

FIG. 6 illustrates an embodiment of a process of acquiring data in flow diagram form, such as may be practiced by a data assembly apparatus for example. At block 610, a determination is made as to whether external data is available, such as by receiving a data available signal for example. At block 620, the data available is read from the external memory, or otherwise received. At block 630, the data is written into an internal memory, such as a ping pong memory. At block 640, a determination is made as to whether data for all expected virtual-containers is available in the ping pong memory. For example, a scoreboard register may be maintained, with status indicating whether data, or a sufficient quantity of data, has been received for each virtual-container. Alternatively, status may be maintained regarding the amount of data available for each virtual-container, or the amount of data available in the ping pong memory. If data is available, the process proceeds to data assembly at block 650, such as the process illustrated in FIG. 5. If data is not available, according to predetermined criteria, the process returns to block 610 to await external data.

Figure 7:
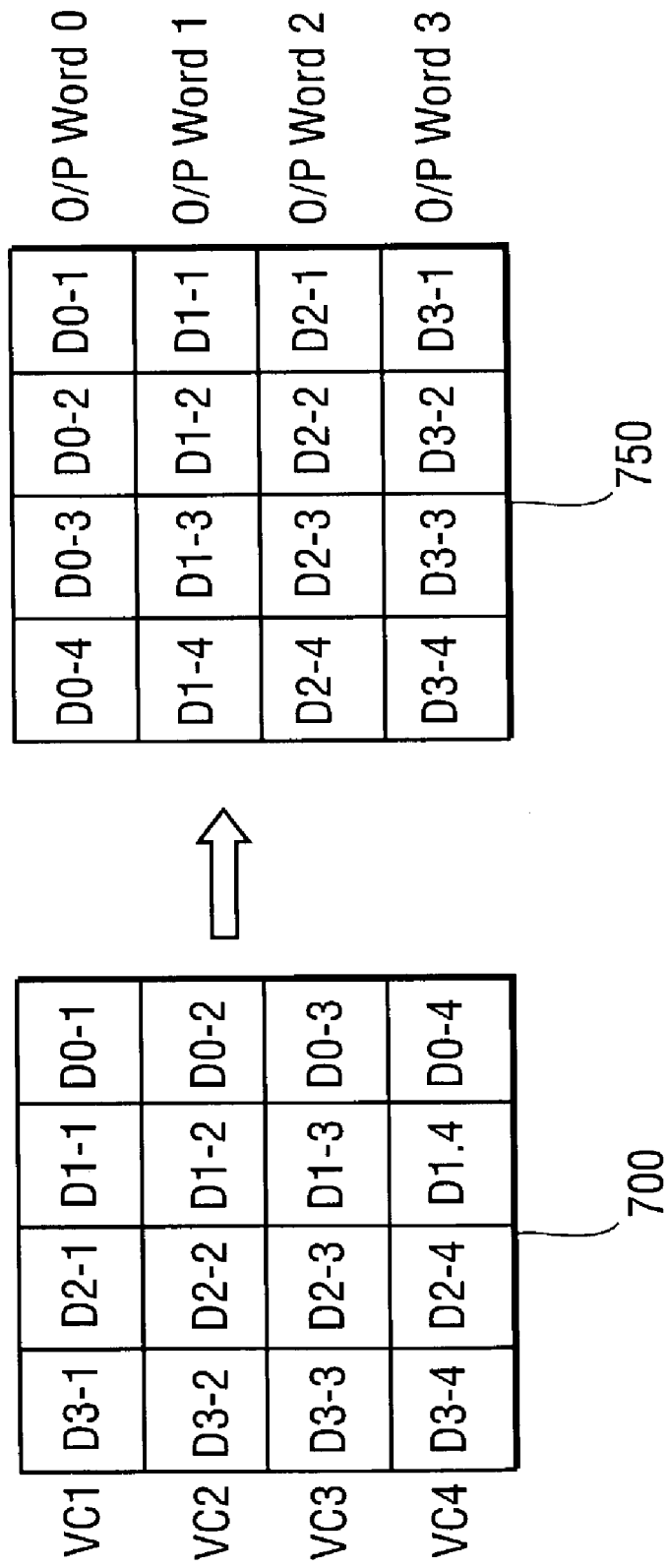
FIG. 7 illustrates how data may be transformed in the process of assembling data in one embodiment.

FIG. 7 illustrates how data may be transformed in the process of assembling data in one embodiment. Data block 700 illustrates the data as it may be available in external memory, and stored in the ping pong memory for example. Data block 750 illustrates the data organized into proper output words. The data may be sorted and interleaved to achieve this result, based on information about the associated virtual-container (such as VC1, VC2, VC3, and VC4) and about the sequence of the data (such as an indication of which byte of a word the data is).

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 2 or 4 may be integrated into components, or may be subdivided into components. Similarly, the blocks of FIG. 3 (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. A method of assembling data within a framer for virtual concatenation, comprising:

receiving a set of unassembled data from a physical layer, which translates signals received from a transmission line, the framer being coupled to a network processor, wherein the framer is configured to deframe data for reception by the network processor, and wherein each unassembled data of the set of unassembled data includes an associated virtual container number and a sequence number, wherein the set of unassembled data arrives at the framer out of order relative to what the network processor expects;

storing the set of unassembled data in an auxiliary memory in storage locations specified by the virtual container numbers;

storing a sequence lookup table that stores the virtual container numbers in a sorted order for a virtual container;

generating addresses for reading the unassembled data from the storage locations within the auxiliary memory corresponding to the set of unassembled data of each of the virtual containers for virtual concatenation;

storing the generated addresses in a sequence map in the sorted order, the sorted order established by the order of the virtual container numbers stored in the sequence lookup table;

reading the unassembled data out of the auxiliary memory in the sorted order at the addresses generated based on the sequence map;

interleaving the unassembled data to form properly ordered data by physically re-ordering the unassembled data using the sequence numbers, wherein the properly ordered data is in an in-order-form relative to what the network processor expects, and wherein the in-order form is the same form of ordered data before transmission to the framer; and transmitting the properly ordered data to the network processor.

2. The method of claim 1, further comprising:
writing properly ordered data to a FIFO.

3. The method of claim 2, further comprising:
determining if all data of the unassembled data is present in the auxiliary memory.

4. The method of claim 3, further comprising:
reading unassembled data from external memory for all virtual containers.

5. The method of claim 4, further comprising:
storing the unassembled data from the external memory for all virtual containers in auxiliary memory.

6. The method of claim 5, further comprising:
determining if writing data to the FIFO may occur.

7. An apparatus for assembling data for virtual concatenation, comprising:

an auxiliary memory having a set of storage locations for data;

an external memory having a set of storage locations for data; and a data assembler coupled to the auxiliary memory and the external memory, the data assembler to read data of a virtual container from the external memory, wherein each data includes an associated virtual container number and a sequence number, to store data of the virtual container in the auxiliary memory in the set of storage locations specified by the virtual container number, to store a sequence lookup table that stores the virtual container number and sequence numbers in order, to determine if all data of the virtual container is present in the auxiliary memory, to generate a set of addresses of the data of the virtual containers in the auxiliary memory, to store the generated addresses in a sequence map in a sorted order based on the order of the virtual container number, to read the data out of the virtual containers from the auxiliary memory in the sorted order based on the associated virtual container numbers of the sequence map, and to byte interleave the sorted data of all the virtual containers by physically re-ordering the data using the sequence numbers to form properly ordered data, wherein the properly ordered data is in an in-order-form relative to what a network processor expects, and wherein the in-order form is the same form of ordered data before transmission to the apparatus.

8. The apparatus of claim 7, further comprising:
a FIFO coupled to the data assembler.

9. The apparatus of claim 8, wherein:
the data assembler further to write the data of the virtual container in interleaved form to the FIFO.

10. The apparatus of claim 9, wherein:
the FIFO having a full signal and the data assembler to receive the full signal from the FIFO.

11. The apparatus of claim 7, wherein:
the data assembler includes an address generator.

12. The apparatus of claim 11, wherein:
the data assembler includes an internal buffer coupled to the address generator.

13. The apparatus of claim 12, wherein:
the data assembler includes a memory interface coupled to the address generator and the internal buffer.

14. The apparatus of claim 13, wherein:
the data assembler includes a data sorter coupled to the internal buffer.

15. The apparatus of claim 14, wherein:
the data assembler includes a byte interleave module coupled to the internal buffer and a control logic block coupled to the byte interleave module, the memory interface, the internal buffer, the data sorter and the address generator.

16. An apparatus for assembling data within a framer for virtual concatenation, comprising:

means for receiving a set of unassembled data from a physical layer, which translates signals received from a transmission line, the framer being coupled to a network processor, wherein the framer is configured to deframe data for reception by the network processor, and wherein each unassembled data of the set of unassembled data includes an associated virtual container number and a sequence number, wherein the set of unassembled data arrives out of order relative to what the network processor expects;

means for storing the set of unassembled data in an auxiliary memory in storage locations specified by the virtual container numbers in a sorted order using the virtual container numbers;

means for generating addresses for reading the unassembled data from the storage locations within the auxiliary memory corresponding to the set of unassembled data from a virtual container for virtual concatenation;

means for storing the generated addresses in a sequence map in the sorted order;

means for reading unassembled data out of the auxiliary memory in the sorted order at the addresses generated based on the sequence map;

means for interleaving unassembled data in the sorted order to form properly ordered data by physically reordering the unassembled data using the sequence numbers, wherein the properly ordered data is in an in-order-form relative to what the network processor expects, and wherein the in-order form is the same form of ordered data before transmission to the framer;

means for transmitting the properly ordered data to the network processor, wherein the properly ordered data appears to the network processor as though it arrived at the framer in a desired in-order form, although it was received at the framer in an undesired out of order form.

17. The apparatus of claim 16, further comprising:
means for writing properly ordered data to a FIFO.

18. The apparatus of claim 17, further comprising:
means for reading unassembled data from the external memory for all the virtual containers to be concatenated.

19. The apparatus of claim 18, further comprising:
means for storing the unassembled data from the virtual containers in auxiliary memory.

* * * * *